(12) United States Patent
Reagan et al.

(10) Patent No.: US 7,039,140 B2
(45) Date of Patent: May 2, 2006

(54) OFDM DATA DEMODULATORS SYNCHRONIZATION

(75) Inventors: John Reagan, Santa Clara, CA (US); Alain Chiodini, Mountain View, CA (US)

(73) Assignee: Proxim Wireless Corporation, Sunnyvale, CA (US)

( * ) Notice: Subject to any disclaimer, the term of this patent is extended or adjusted under 35 U.S.C. 154(b) by 799 days.

(21) Appl. No.: 09/803,081

(22) Filed: Mar. 8, 2001

(65) Prior Publication Data

US 2002/0159531 A1  Oct. 31, 2002

(51) Int. Cl.
*H04L 7/00* (2006.01)

(52) U.S. Cl. ............... 375/355; 375/342; 370/503; 327/141

(58) Field of Classification Search ............... 375/716, 375/342, 340, 346, 224, 285, 355; 370/503, 370/509, 512–513; 327/141
See application file for complete search history.

(56) References Cited

U.S. PATENT DOCUMENTS

| | | | | |
|---|---|---|---|---|
| 4,587,662 | A * | 5/1986 | Langewellpott | 375/138 |
| 6,128,355 | A * | 10/2000 | Backman et al. | 375/347 |
| 6,421,402 | B1 * | 7/2002 | Piirainen | 375/346 |
| 6,754,170 | B1 * | 6/2004 | Ward | 370/208 |
| 2001/0017597 | A1 * | 8/2001 | Walley et al. | 342/165 |
| 2002/0051485 | A1 * | 5/2002 | Bottomley | 375/147 |

OTHER PUBLICATIONS

Saleem Mohideen et al, "On Recursive Calculation of the Generalized Inverse of a Matrix", ACM Transactions on Mathematical Software, vol. 17, No. 1,, Mar. 1991, pp. 130-147.*

Ha, Seong Ho, "A Decision-Directed Frame Synchronization Algorithm for OFDM Systems", Jul. 2000, IEICE Trans. Commun., vol. E83-B, No. 7, pp. 1563-1566.

Onizawa, Takeshi, "A Fast Synchronization Scheme of OFDM Signals for High-Rate Wireless LAN", Feb. 1999, IEICE Trans. Commun., vol. E83-B, No. 2, pp. 455-463.

* cited by examiner

*Primary Examiner*—Jean B. Corrielus
(74) *Attorney, Agent, or Firm*—Thelen Reid & Priest LLP

(57) ABSTRACT

Orthogonal frequency division multiplexing (OFDM) receiver embodiments of the invention provide data demodulator synchronization by finding the end of the short preamble in an IEEE-802.11a burst transmission. This method exploits the fact that there are certain symmetries in the long-preamble that can be used to determine synchronization. The long-preamble sequence is composed of a guard interval (GI) and two long-preamble symbols; the GI is the last 32 samples of the long-preamble symbol. The $32^{nd}$ sample of the long-preamble acts as a "pilot" or "anchor" sample in that the previous N and subsequent N samples are complex conjugates, or conjugate "mirror" vectors. Due to the periodicities of the long-preamble, this property repeats every 32 samples. No other samples in the long preamble exhibit this property. Coherent combining is used in one embodiment for robustness. Once this "pilot" or "anchor" sample is located, the end of the short-preamble is declared to have occurred 32 samples earlier, thus establishing a time reference.

3 Claims, 3 Drawing Sheets

OFDM DATA DEMODULATORS SYNCHRONIZATION

BACKGROUND OF THE INVENTION

1. Technical Field

The invention relates to physical layer (PHY) digital signal processing for use in processors developed for wireless local area networks (LAN's), and more particularly to wireless LAN's based on orthogonal frequency division multiplexing (OFDM) in the license-free national information structure (U-NII) radio spectrum bands in the United States and generally conforming to IEEE Specification 802.11a.

2. Description of the Prior Art

Local area networks (LAN's) have traditionally been interconnected by twisted-wire pairs and shielded cables. However, there are several deficiencies of traditional LAN's. The main being restricted mobility. In contrast, a whole class of untethered computing has emerged which uses complex modulation and coding to achieve high-speed data rates. The IEEE 802.11a standard, herein "802.11a", specifies, among other things, the physical layer (PHY) entity for an orthogonal frequency division multiplexing (OFDM) system with data payload communication capabilities of 6, 9, 12, 18, 24, 36, 48, and 54 Mb/s. The 802.11a standard specifies RF transmission in the 5.15–5.25, 5.25–5.35, and 5.725–5.825 GHZ unlicensed national information structure (U-NII) bands.

Typically, the IEEE communication standards specify the transmit bit-stream in addition to performance specifications, RF emissions requirements, etc. The wireless transmission medium inherently introduces some unique impairments (not present in traditional LAN's) to the transmitted signal which must be mitigated in the remote receiver station. These impairments include signal fading, multi-path reflections, base- and remote-unit oscillator mismatch introduced frequency offset, timing misalignment, and timing synchronization. In addition, there are RF hardware limitations such as receiver IQ imbalance and phase noise that must be mitigated as well. As such, the mitigation of such effects falls under the category of baseband digital signal processing. To assist the remote unit in mitigating these effects, a known training sequence is usually embedded into the transmit bit stream; this occurs at the expense of bandwidth. Of course, the same problems occur in the upstream direction (remote station transmitting to the base station), but it suffices to discuss the downstream digital signal processing.

In this disclosure, one such digital signal processing method, timing synchronization, is outlined. This processing block determines an absolute timing reference for the received burst. For the 802.11a standard, determining the boundary between the short- and long-preamble is sufficient to establish synchronization, i.e. if the start of the long-preamble is known, then data demodulation can proceed.

It is assumed that some form of frequency correction has been applied to the signal prior to performing synchronization estimation. One embodiment of coarse frequency estimation is disclosed in "Coarse Frequency Offset Estimation—, co-pending application Ser. No. 09/802,609, filed on Mar. 8, 2001. Alain Chiodini, John Reagan, nBand Communications, 2000.

Conventional methods for establishing timing synchronization are correlation-based methods which correlate a portion of the known short- and long-preamble with the received data. However, there are several disadvantages of this type of approach. These are: (a) a sequence needs to be stored locally, and (b) the pre-stored sequence does not account for signal distortions (A/D, quantization effects, phase distortion, IQ imbalance, . . . ) which results in non-optimal correlation values.

The transmission scheme in 802.11a is bursty. This means that the receivers must digitally process the training sequence to mitigate the undesired signal impairments each time a burst commences. This means that it is desirable for the processing blocks to be as robust and computationally efficient as possible.

SUMMARY OF THE INVENTION

Orthogonal frequency division multiplexing (OFDM) receiver embodiments of the invention provide data demodulator synchronization by finding the end of the short preamble in an IEEE-802.11a burst transmission. This method exploits the fact that there are certain symmetries in the long-preamble that can be used to determine synchronization. The long-preamble sequence is composed of a guard interval (GI) and two long-preamble symbols. The GI is the last 32 samples of the long-preamble symbol. The $32^{nd}$ sample of the long-preamble acts as a "pilot" or "anchor" sample in that the previous N and subsequent N samples are complex conjugates, or conjugate "mirror" vectors. Due to the periodicities of the long-preamble, this property repeats every 32 samples. No other samples in the long preamble exhibit this property. Coherent combining is used in one embodiment for robustness. Once this "pilot" or "anchor" sample is located, the end of the short-preamble is declared to have occurred 32 samples earlier, thus establishing a time reference.

DETAILED DESCRIPTION OF THE INVENTION

Figure 1:
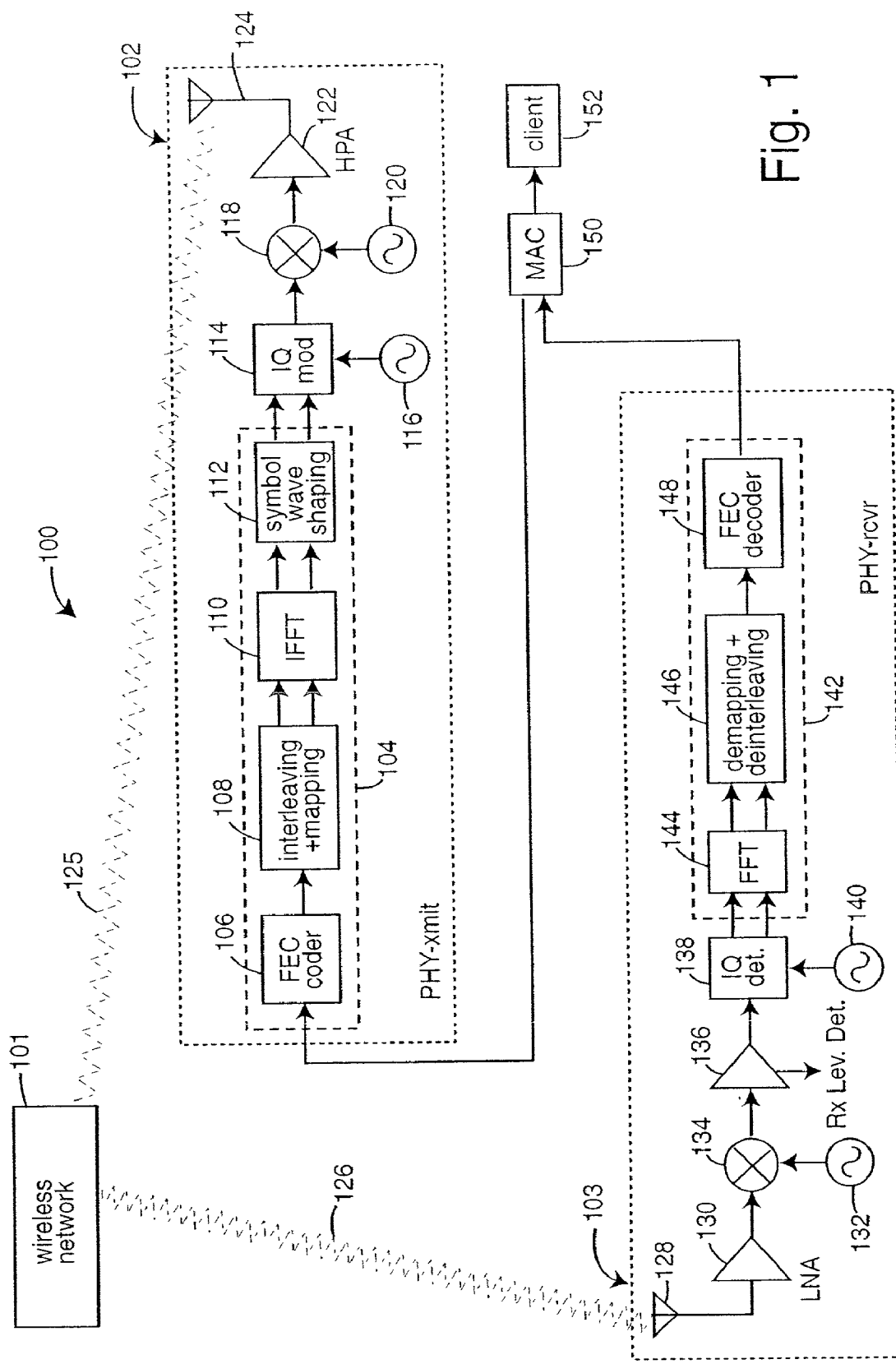
FIG. 1 is a functional block diagram of an OFDM radio-transceiver embodiment of the invention.
Figure 2:
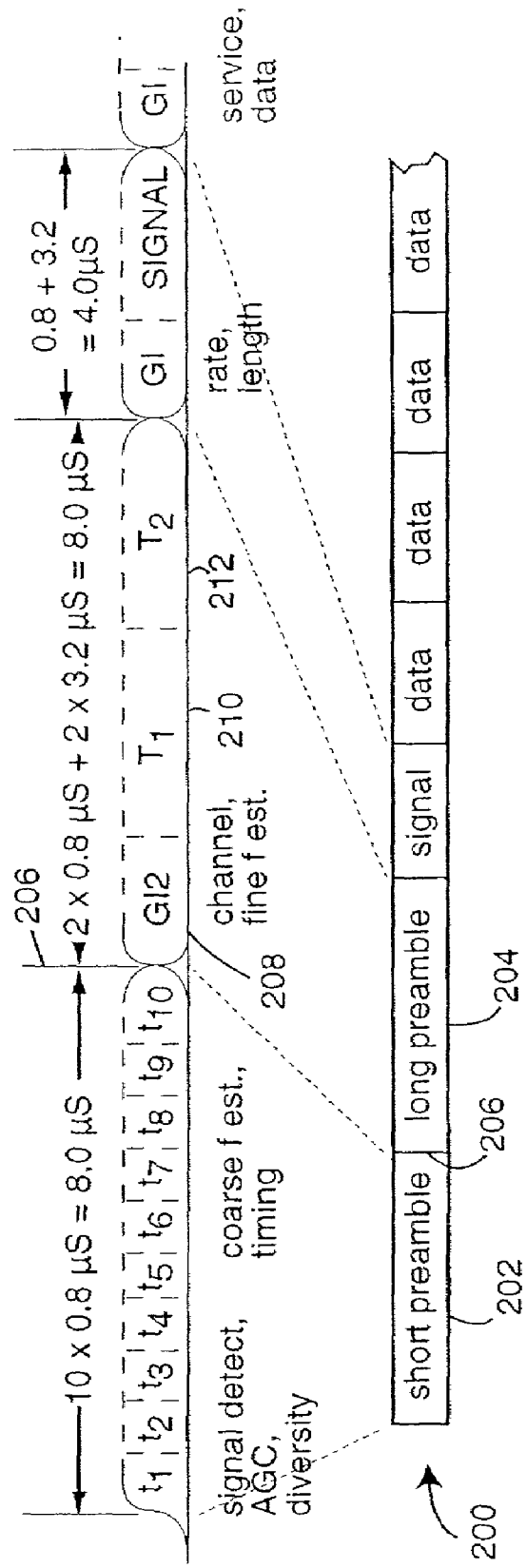
FIG. 2 is a diagram representing the structure of the synchronizing PLCP preamble, signal, and data fields used for the physical layer (PHY) of a wireless local area network (LAN) conforming to the IEEE-802.11a Specification.

FIG. 1 illustrates a wireless local area network (LAN) embodiment of the invention, and is referred to herein by the general reference numeral 100. Such wireless LAN is preferably based on orthogonal frequency division multiplexing (OFDM), and quadrature amplitude modulated (QAM) signals transmitted in the license-free 5 GHz frequency band. The wireless LAN 100 typically includes a wireless network 101 connected to the Internet, a PHY-transmitter 102, and a PHY-receiver 103. Such all conform to the IEEE-802.11a specification for a physical layer (PHY) interface in a wireless local area network which allows mobile clients. The transmitter 102 comprises a digital signal processor (DSP) 104 which implements a forward error correction (FEC) coder 106, an interleaving and mapping process 108, an inverse fast Fourier transform processor 110, and a symbol wave shaper 112. The DSP 104 outputs in-phase (I) and quadrature-phase (Q) signals that are input to an IQ modulator 114 driven by a local oscillator 116. The modulated output is sent to a mixer 118 for upconversion to the 5 GHz band. A second local oscillator 120 provides the necessary carrier frequency. A high power amplifier (HPA) 122 drives a transmitter antenna 124. A radio up-link 125 is received by the wireless network 101. In general, the transmitter 102 can be implemented with conventional methods and components.

The receiver 103 receives a radio down-link 126 that is typically transmitted in bursts. Each burst is begun with a training sequence, e.g. a short and long preamble. The receiver 103 includes a receiver antenna 128 followed by a low-noise amplifier (LNA) 130. A local oscillator 132 and a first mixer 134 produce an intermediate frequency (IF). An automatic gain control (AGC) amplifier 136 smoothes out signal-strength variations and drives an IQ-detector 138. A buffer is used to store I/Q samples as received for subsequent digital signal processing, e.g. to find the end of the short preamble.

A second local oscillator 140 provides the carrier necessary to derive the I/Q samples, e.g. 16-bit binary at 20.0 MHz. In all embodiments of the invention, no automatic frequency control (AFC) clock recovery is needed because any frequency offset errors are corrected in later digital processing. A receiver-DSP 142 comprises a fast Fourier transform process 144, a demapping and deinterleaving process 146, and an FEC decoder 148. The receiver-DSP 142 further includes the necessary digital logic needed for carrier frequency offset determination and correction.

The higher levels of the mobile client are represented by a media access controller (MAC) 150 and a client agent software 152.

The long preamble begins with a guard interval (GI) 208 that is two 0.8 µS units long. Each long symbol (T1 and T2) 210 and 212 is 3.2 µS in transmission duration. The received signal is typically measured in 16-bit I/Q samples every 0.05 µS, as illustrated in step 302 of the method 300 illustrated in FIG. 3 (discussed in detail below). Thus, there are thirty-two samples that span the 1.6 µS of GI 208. The object is to find the boundary 206 between the short and long preambles 202 and 204.

Figure 3:
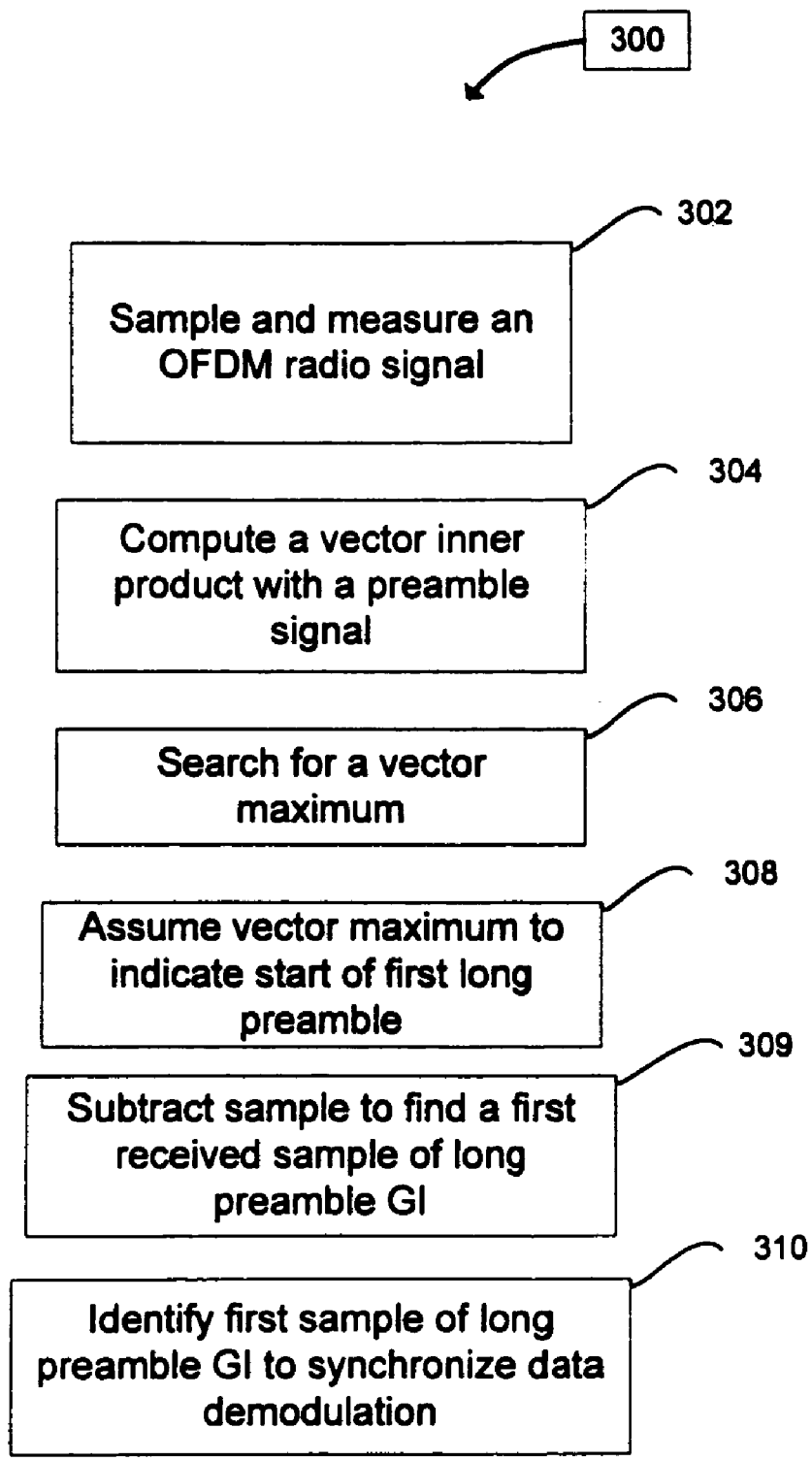
FIG. 3 is a flowchart of a method embodiment of the invention for demodulator synchronization by determining the boundary-point timing between the short and long preamble, (note that for simplicity the coherent and non-coherent combining concepts are not shown).

FIG. 3 diagrams a method embodiment of the invention for determining the end of the short preamble, and is referred to herein by the general reference numeral 300.

The preferred method embodiment of the invention uses reverse index multiplication to find the boundary between the short and long preambles. It is assumed that the packet detection algorithm already has established a "rough" timing reference, i.e. sample x(0) may be not necessarily be the first sample of the packet, but that the start of the packet is known to lie somewhere between x(0) and x(16) for example. Starting at sample x(n)(somewhere "close" to the boundary), the vector comprised of [x(n) x(n−1) . . . x(n−N−1)] is conjugate multiplied with the vector comprised of [x(n) x(n+1) . . . x(n+N−1)]. For all n not equal to the $32^{nd}$ sample into the long-preamble, the result is noise-like. When n equal the $32^{nd}$ sample of the long-preamble, the product yields a large number. Due to the symmetries, the same property (and values) hold for n offset by 64 samples. Because of this, these vectors can be coherently combined prior to taking the inner product in step 304 of FIG. 3. The vectors offset by 32 exhibit the same property (but not values) and are non-coherently combined. The magnitude squared of the result is computed and stored in a vector at step 306. index of the maximum of the vector is the index of the start of the first long preamble symbol, as assumed in step 308, and subtracting thirty-two at step 309 yields the index of the start of the long-preamble sequence, as indicated in step 310.

This is computed as follows:

$$y(n) = \left\| \sum_{k=0}^{N-1} \{x(n-k) + x(n-k+64)\}\{x(n+k) + x(n+k+64)\} + \sum_{k=0}^{N-1} x(n+32-k)x(n+32+k) \right\|^2$$

Constraint-Based Correlator:

An alternative embodiment of the current invention is as follows; The idea consists in including potential signal distortions (such as frequency offset, timing offset, etc), which could cause the characteristics of the received signal to differ from what was expected, into the ideal signal through the means of constraints. Basically, one wants to include as many constraints as there identifiable distortions. Please note that including a large number of constraints may result in significant performance deterioration, i.e. the magnitude of the correlation peak may significantly decrease. The original reference signal (unconstrained) R consists of the parts of the long and short preambles that surround their common boundary (we have chosen this boundary to be our timing reference point for subsequent processing stages (demodulation, etc)). The goal is to produce a peak when the received signal correlates well with the reference signal whether distortions (frequency offset, timing offset, etc) are present or not. From a mathematical standpoint, this statement translates as follows:

$$R_c x^T = 1, \; R_c\left(x + \frac{\partial x}{\partial f}\right)^T = 1, \; R_c\left(x + \frac{\partial x}{\partial t}\right)^T = 1, \text{ etc}$$

Where $R_c$, x, $(\;)^T$, f, t respectively designate the constrained reference signal, the received signal, the transpose operator, the frequency and the time. In the current implementation, $R_c$ is calculated once for all and stored into a lookup table. $R_c$ is computed through the utilization of Penrose's pseudo inverse (also known as generalized inverse): $R_c$ is the first column of the following Z matrix:

$$Q = \begin{bmatrix} R \\ \frac{\partial R}{\partial f} \\ \frac{\partial R}{\partial t} \\ etc \end{bmatrix}, \; Z = pinv(Q)$$

Please note that one or more constraints can also be added (or removed) on the fly should one need to. For example, well-known mathematical methods exist to recursively calculate the new generalized inverse when a row vector, i.e. a new constraint is added (or deleted) to Q (please see the following paper for more details: "On Recursive Calculation of the Generalized Inverse of a Matrix" by Saleem Mohideen and Vladimir Cherkassky).

In the current implementation, $R_c$ is a 32-sample-long signal.

Maximum Coherent Combining:

The structure of the long-preamble invites another interesting alternative to the preferred embodiment. The reason that the x(n+32) terms could not be directly coherently combined with the x(n) and x(n+64) terms was that, although the previous and subsequent values around x(n+32) exhibit the complex conjugate property, the actual "values" were not the same as those at x(n) and x(n+64). However, some massaging of the samples around x(n+32) can be performed so as to achieve a "coherent" copy of the samples around x(n) and x(n+64).

$$\vec{z}_B = [-x(n+32) \quad flipud(conj(x(n+32-1:-1:n+32-N)))]$$

$$\vec{z}_F = [-x(n+32) \quad flipud(conj(x(n+32+1:1:n+32+N)))]$$

$$y(n) = \left\| \sum_{k=0}^{N-1} \{x(n-k) + x(n-k+64) + \vec{z}_B(k)\} \{x(n+k) + x(n+k+64) + \vec{z}_F(n)\} \right\|^2$$

By doing this, maximum coherent combining is achieved and should result in the most robust and stable peak in the objective function. All of the operations specified in (1) are well suited for execution on a vector DSP processor which supports vector conjugation, strided loads, and vector maximum operations.

Non-Coherent Combining:

This approach is very similar to preferred embodiment with the exception that the x(n+64) terms are not used; therefore, no coherent combining. Basically, the vector inner products (complex) result of the previous and subsequent samples starting at x(n) and x(n+32) are added and then collect the sample at x(n+64+32).

$$y(n) = \left\| \sum_{k=0}^{N-1} x(n-k)x(n+k) + \sum_{k=0}^{N-1} x(n+32-k)x(n+32+k) \right\|^2$$

Because this method does not fully exploit the correlation present, one can expect the peak of the objective function to not be as distinguishable as in the previous cases.

Relative Phase Transversal:

There is another potential method which may be useful for the determination of the start of the long-preamble and thus enabling synchronization. This method exploits the specific structure in long-preamble. Let x(0) be the first sample of the long-preamble. In the absence of signal impairments, the sequence of points, x(16), x(32), x(48), x(64), x(80), x(96) exhibits a unique relative phase transversal. In the absence of signal impairments, the absolute phase of this sequence should be π/4, 0, −π/4, −π, π/4, 0. relative phases will be 0, −π/4, −π/2, −5π/4, 0, −π/4.

In both the short- and long preambles, no other set of 6 samples separated by 16 samples exhibits this relative transversal.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A synchronization method for data demodulation in an OFDM radio receiver, comprising the steps of:
sampling and measuring an OFDM radio transmission to obtain a series of received-signal samples that represent a short preamble, a long preamble, a long preamble guard interval (GI), and a first long preamble, respectively;

computing an inner product of vectors comprised of samples x(n), x(n−1), . . . , x(n−1−N) and x(n), x(n+1), . . . , x(n+N−1) of said received-signal samples and computing the magnitude squared of a coherent and non-coherent combination determined by:

$$y(n) = \left\| \sum_{k=0}^{N-1} \{x(n-k) + x(n-k+64)\} \{x(n+k) + x(n+k+64)\} + \sum_{k=0}^{N-1} x(n+32-k)x(n+32+k) \right\|^2$$

assuming an index of the maximum of the result of the combination is the index of the start of the first long preamble;

subtracting a corresponding number of samples from the result of the combination to find a first received-signal sample of said long preamble guard interval (GI); and identifying said first received-signal sample of said long preamble GI to synchronize any data demodulation of subsequent parts of said OFDM radio transmission, wherein n is an integer identifying the n'th sample, x(n), of the vectors, N is an integer having a value determining the number of samples in the vectors, and k is an integer having a value varying from 0 to N−1.

2. A synchronization method for data demodulation in an OFDM radio receiver, comprising the steps of:
sampling and measuring an OFDM radio transmission to obtain a series of received-signal samples that represent a short preamble, a long preamble guard interval (GI), and a first long preamble, respectively;

mathematically manipulating the series of received-signal samples around x(n+32) as to achieve a coherent copy of the samples around x(n) and x(n+64) as follows:

$$\vec{z}_B = [-x(n+32) \quad flipud(conj(x(n+32-1:-1:n+32-N)))]$$

$$\vec{z}_F = [-x(n+32) \quad flipud(conj(x(n+32+1:1:n+32+N)))]$$

$$y(n) = \left\| \sum_{k=0}^{N-1} \{x(n-k) + x(n-k+64) + \vec{z}_B(k)\} \{x(n+k) + x(n+k+64) + \vec{z}_F(n)\} \right\|^2$$

assuming an index of the maximum of the result of the manipulating step is the index of the start of the first long preamble;

subtracting a corresponding number of samples from the result of the manipulating step to find a first received-signal sample of said long preamble guard interval (GI); and identifying said first received-signal sample of said long preamble GI to synchronize any data demodulation of subsequent parts of said OFDM radio transmission, wherein n is an integer identifying the n'th sample, x(n), of the vectors, N is an integer having a value determining the number of samples in the vectors, and k is an integer having a value varying from 0 to N−1.

3. A synchronization method for data demodulation in an OFDM receiver, comprising the steps of:

sampling and measuring OFDM radio transmission to obtain a series of received-signal samples that represent a short preamble, a long preamble guard interval (GI), and a first long preamble, respectively;

adding and collecting the vector inner products of the previous and subsequent samples starting at x(n) and x(n+32) and adding and collecting samples at x(n+64+32) as follows:

$$y(n) = \left\| \sum_{k=0}^{N-1} x(n-k)x(n+k) + \sum_{k=0}^{N-1} x(n+32-k)x(n+32+k) \right\|^2$$

assuming an index of the maximum of the result of the adding and collecting step is the index of the start of the first long preamble;

subtracting a corresponding number of samples from the result of the adding and collegting step to find a first received-signal sample of said long preamble guard interval (GI); and identifying said first received-signal sample of said long preamble GI to synchronize any data demodulation of subsequent parts of said OFDM radio transmission, wherein n is an integer identifying the n'th sample, x(n), of the vectors, N is an integer having a value determining the number of samples in the vectors, and k is an integer having a value varying from 0 to N−1.

* * * * *